United States Patent [19]
Cioffi et al.

[11] Patent Number: 5,428,638
[45] Date of Patent: Jun. 27, 1995

[54] METHOD AND APPARATUS FOR REDUCING POWER CONSUMPTION IN DIGITAL COMMUNICATIONS DEVICES

[75] Inventors: Kenneth R. Cioffi, San Jose; David S. Parkinson, Santa Clara; Peter O. Okrah, Mountain View; Cynthia C. Robinson, San Jose; Russell P. Prosynchak, Sunnyvale; Tim A. Williams, Danville, all of Calif.

[73] Assignee: Wireless Access Inc., Santa Clara, Calif.

[21] Appl. No.: 102,479

[22] Filed: Aug. 5, 1993

[51] Int. Cl.$^6$ .................. H04B 3/46; H04B 17/00
[52] U.S. Cl. ........................ 375/224; 455/38.3; 455/231; 455/343; 375/295; 375/340; 375/354
[58] Field of Search ............ 375/10, 59, 75, 106, 375/94; 455/38.3, 67.1, 67.3, 343, 231

[56] References Cited

U.S. PATENT DOCUMENTS

| | | |
|---|---|---|
| 4,631,496 | 12/1986 | Borras et al. .................. 455/343 |
| 4,910,752 | 3/1990 | Yester, Jr. et al. ............ 375/75 |
| 5,027,428 | 6/1991 | Ishiguro et al. ............... 375/75 |
| 5,144,296 | 9/1992 | DeLuca et al. ................ 455/343 |
| 5,193,212 | 3/1993 | Son ............................... 455/38.3 |
| 5,251,325 | 10/1993 | Davis et al. ................... 455/38.3 |

*Primary Examiner*—Stephen Chin
*Assistant Examiner*—Amanda T. Le
*Attorney, Agent, or Firm*—Blakely, Sokoloff, Taylor & Zafman

[57] ABSTRACT

An apparatus and method to transmit and receive digital signals in a communication system having a power source that provides power to a portion of a communication device and a mechanism to disable power to that portion of the communication device for periods of time, such that a reduced power consumption state is entered. Also included is sampling hardware to sample the signal during those periods of time when the communication device is not in the reduced power consumption state, which occurs when data is transferred or received.

20 Claims, 6 Drawing Sheets

FIG_1

FIG_2

FIG_3

FIG_4

FIG_5A

FIG_5B

FIG_5C

FIG_5D

FIG_6

FIG_7

FIG_8

METHOD AND APPARATUS FOR REDUCING POWER CONSUMPTION IN DIGITAL COMMUNICATIONS DEVICES

FIELD OF THE INVENTION

The field of the invention relates to digital communications systems; more particularly, the present invention relates to the field of power reduction in wireless digital communications devices.

BACKGROUND OF THE INVENTION

A communications system transfers information between a source and a destination. Generally, a communications system includes a transmitter and a receiver which transmit and receive information signals over some media. This media may be cable wiring or atmosphere. When communications occur over atmosphere, or airwaves, they are commonly referred to as "wireless" communications. Examples of wireless communications systems include digital cellular, packet data, paging and digital cordless telephones, wireless modems, wireless local and wide area networks, digital satellite communications and personal communications networks.

Inherent in some wireless communications systems is equipment mobility. In other words, since the communication media is air, wireless communications equipment may be portable. If the equipment is portable, this communication equipment must provide its own source of power, such as a battery unit.

In order to increase utility of such portable wireless communications equipment, recent efforts have focused on lowering the DC power consumption of the circuitry. By lowering the DC power consumption, the unit's size may be reduced and/or the unit's battery life may be extended. One prior art technique for reducing the power consumption of the circuitry in portable wireless communications equipment is referred to as duty cycling. Conventional duty cycling provides power to a transmitter or a receiver at periodic intervals for a predetermined amount of time. During this time interval, data is sent or received by the transmitter and receiver respectively. The amount of time that the unit is powered depends on the system protocol. Duty cycling is useful when the data being transferred need not be sent continuously and provides power savings proportional to the ratio of the on-time to the off-time.

Presently, in digital communications systems, the receiving or transmitting circuitry is powered continuously during data reception or transmission. That is, even though a transmitter or receiver employs duty cycling, power is being consumed continuously during the periodic intervals. The narrow bandwidth of the available radio frequency spectrum limits the data transmission in a wireless communications systems to rates which are generally much lower than what would otherwise be processable given the speed of the portable unit's internal circuitry. Because of this, much of the power that is consumed during transmission and reception is wasted. Therefore, it is desirable in a digital communications systems to reduce this waste by taking advantage of the circuitry speed.

The present invention provides a digital communications system that has reduced power consumption in digital communications applications. The present invention reduces power consumption during reception or transmission using the speed of the internal circuitry of the communications unit.

SUMMARY OF THE INVENTION

A method and apparatus for receiving and transmitting digital signals in a communication system is described. The present invention includes a method and apparatus for providing power to a portion of a communication device for a period of time during each symbol period. The present invention also includes a method and apparatus for sampling the signal during the predetermined period of time. In other words, during the predetermined period of time, the data is transferred or received.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A method and apparatus for reducing power consumption in a digital communications system is described. In the following detailed description of the present invention numerous specific details are set forth, such as types of wireless communications devices, time period, sizes, ratios, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

The Digital Communications System

Figure 1:
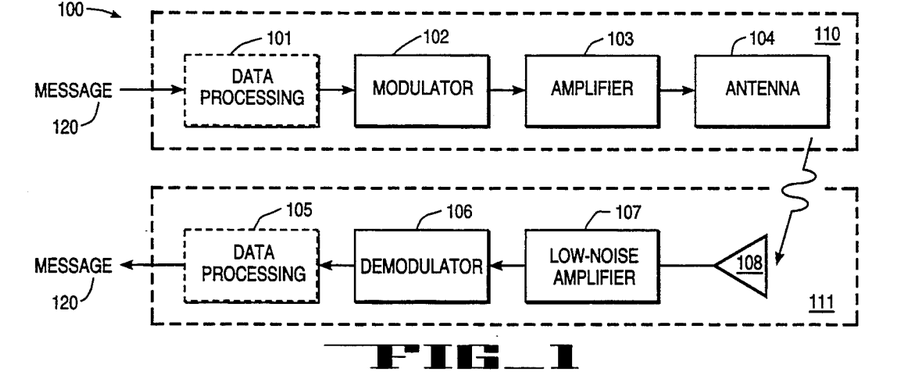
FIG. 1 is a block diagram of a digital communications system.

FIG. 1 illustrates a block diagram of one embodiment of a digital communications system. The present invention is advantageously employed in wireless data communication systems. However, the present invention may be employed in other data communications systems.

Referring to FIG. 1, digital communications system 100 comprises transmitter 110 and receiver 111. Transmitter 110 includes data processing block 101 (optional), modulator 102, amplifier 103 and antenna 104. Data processing block 101 is coupled to receive a message 120. The output of data processing block 101 is coupled to the input of modulator 102. The output of modulator 102 is coupled to input of amplifier 103. The output of amplifier 103 is coupled to transmitting antenna 104. The output from transmitting antenna 104 is radiated into the transmission medium and subsequently received by receiver antenna 108. The output of receiver antenna 108 is coupled to the input of low-noise amplifier 107. The output of low-noise amplifier 107 is coupled to the input of demodulator 106. The output of demodulator 106 is coupled to the input of data processing block 105 (optional). The output of data processing block 105 is message 120.

Transmitter 110 transmits the signals throughout the digital communications system. Message signal 120 is initially received at the input of transmitter 110 and filtered to eliminate undesired components. Then, assuming message signal 120 is suitable for transmission, data processing block 101 samples message signal 120 and performs any necessary analog-to-digital conversion. Data processing block 101 may perform encoding, and any peripheral functions, such as output, displays, storage, etc. The output of data processing block 101 is a group of binary symbols. These binary symbols may undergo source coding.

The digitized output symbols from data processing block 101 are then modulated onto a carrier. In modulator 102, a parameter of the carrier, such as amplitude, frequency or phase, is modulated by the digital symbols. The modulation scheme of the present invention may be one of the many well-known modulation techniques, such as frequency shift keying, phase shift keying, amplitude shift keying (or on-off keying), and their many variations.

The modulated signal output from modulator 102 is amplified by amplifier 103 and input to the channel, wherein the modulated signals are transferred to their destination. In FIG. 1, the channel includes transmitting antenna 104, the space between transmitter 110 and receiver 111, and receiving antenna 108. The channel may include airwaves, cables, optical fiber, or other means for transferring the signals between transmitter 110 and receiver 111.

Once a signal is received by receiving antenna 108 in receiver 111, the signal is amplified by low-noise amplifier 107, demodulated by demodulator 106, and then processed by data processing block 105 (if required) to reproduce message 120, where data processing block performs any desired output, display, or storage functions as well as any desired decoding.

In one embodiment, data processing 101 (and data processing 105) of the digital communications system controls symbol period sampling by controlling the DC voltage to portions of the modulator/demodulator circuitry as well as the amplifiers. In symbol period sampling, each bit is either transmitted or received for only a portion of the symbol period. In other embodiments, the symbol period may be the time required to transmit a receiver two or more bits of information.

Although digital communication system 100 is shown with only a small set of components, other components may be included in the system. For instance, coders and decoders may be employed in transmitter 110 and receiver 111 respectively. Also, even though transmitter 110 and receiver 111 are shown as individual components, each may be part of a transceiver capable of performing both the transmit and receive functions.

Overview Of The Present Invention

The present invention reduces the direct current (DC) power consumption in digital communications applications in which the DC power to portions of the transceiver circuitry are pulsed during only a portion of each symbol period. The present invention is independent of the system protocol and any duty cycling being used in the system. In the present invention, each bit period has its own power cycle dependent only on the ability of the system to monitor and detect it. By turning on the power for only a portion of the symbol period, power consumption is reduced.

Figure 2:
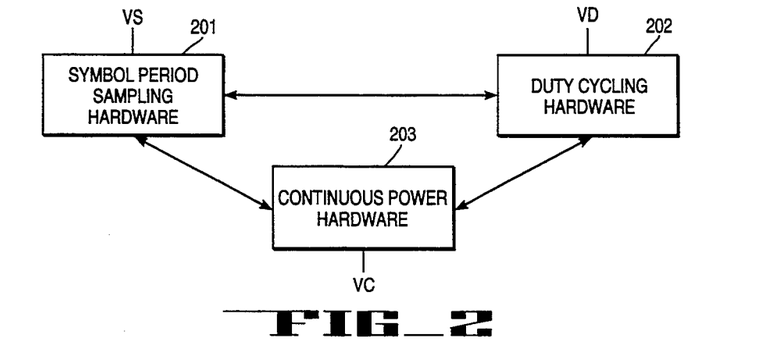
FIG. 2 is a block diagram of the digital communications system partitioned into power cycling functionality.

FIG. 2 is an illustration of the digital communications system of FIG. 1 partitioned into three separate sub-systems according to their power usage. These sub-systems include symbol period sampling hardware 201, duty cycling hardware 202, and continuous power hardware 203. Voltage VS is the DC voltage applied to the symbol period sampling hardware. Duty cycling hardware 202 operates when voltage VD is applied to its circuitry. Continuous power hardware 203 operates when voltage VC is applied to its circuitry. Each of the three sub-systems operate together to provide the necessary functionality of the communications system.

The symbol sampling hardware 201 is a circuitry which is active only during the symbol sampling period. Since symbol sampling hardware 201 is turned on and off during each symbol period, the circuitry partitioned to receive the voltage VS must be able to switch on and off fast enough to provide functionality during the time interval set forth for sampling. In one embodiment, the circuitry includes the analog front end and data demodulation functions. For instance, the symbol period sampling hardware 201 may include the RF front end having an amplifier, mixer, and multiplier, as well as an intermediate frequency (IF) amplifier.

The duty cycling hardware 202 is the system circuitry that cannot be pulsed fast enough to be included in the symbol period sampling hardware 201 or is the circuitry required to manipulate the incoming data during the time when the symbol period sampling hardware is not on. This circuitry is characterized as duty cycling hardware 202 due to the circuitry requiring power only during the transmit or receive cycles. Examples of duty cycling hardware 202 may include oscillators which cannot be turned on fast enough to be activated in symbol period sampling hardware 201. In other embodiments, an integrated circuit, such as a demodulation chip, which is designed to be turned on and off at speeds slower than those required to function properly within symbol period sampling hardware 101 may also be included.

Continuous power hardware 203 represents the circuitry that must be powered continuously. Continuous power hardware 203 generally includes, but is not limited to, the system timing clock and counting circuitry. The timing clock provides timing signals to the symbol sampling hardware 201 and the duty cycling hardware 202. The counting circuitry may be used to determine the time at which symbol period sampling hardware 201 and duty cycling hardware 202 are to be on and off. The use of counting circuitry to determine the time at which power is to turn on and off is well-known in the art.

Clock And Voltage Cycling

Figure 3:
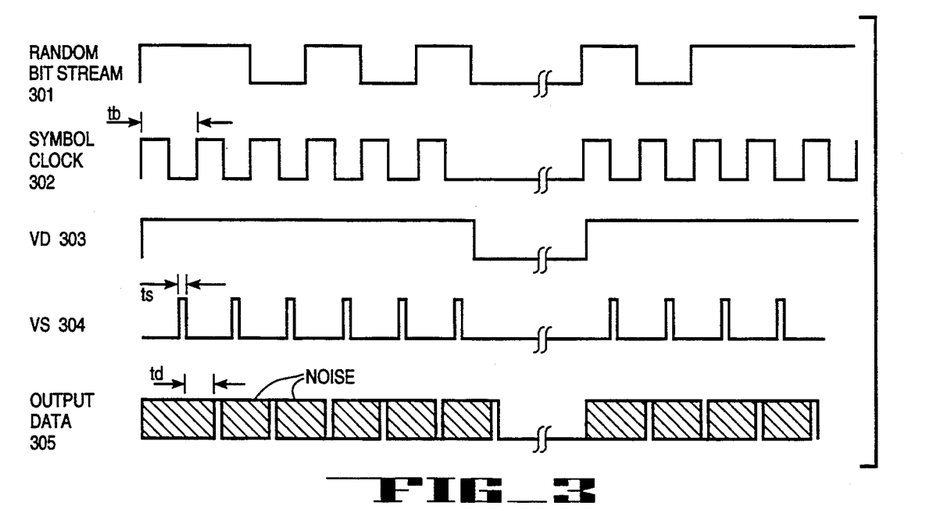
FIG. 3 is a timing diagram depicting the clock cycling and voltage cycling waveforms for a digital communications system.

FIG. 3 is a timing diagram that describes the waveforms of the power supply VS and VD in relation to the incoming (or outgoing) bit stream and baud clock. It should be noted that the voltage VC to the continuous power hardware 203 is always in the high state and, thus, has been omitted. Referring to FIG. 3, a random bit stream 301 is shown. When the random bit stream is in the high state during a symbol period, then the bit is a logical "1". On the other hand, if the bit-stream is in the low state during a symbol period, then the bit is logical "0". This correspondence between logical "1" and "0" with the high and low states of the bits in the bit-stream may be reversed.

A symbol clock 302 is shown. The symbol clock 302 is generated by the clocking circuitry in continuous power hardware 303. In one embodiment, the baud period is defined as one cycle of the symbol clock. The baud or symbol period is denoted as tb in FIG. 3.

The waveform 303 for voltage VD is shown. The VD waveform 303 indicates when voltage VD is on. When the VD waveform 303 is in the high state, the voltage is applied to duty cycling hardware 202, such that duty cycling hardware 202 is active and duty cycling is performed. On the other hand, when VD waveform 303 is low, it indicates that the power has been disabled from duty cycling hardware 202. In the present invention, the voltage VD is on according to the system duty cycle.

The waveform 304 is the voltage VS waveform. VS waveform 304 is shown in the high state, thereby indicating that the symbol period sampling hardware 201 is powered and active, for only a period of time ts in every symbol period. While voltage VD is on according to the system duty cycle, voltage VS is pulsed at least once during each bit period. In this manner, the power to the symbol period sampling circuitry is reduced by the factor of the ratio of the time of the bit sampling pulse, ts, to the baud period, tb, referred to as the symbol period sampling ratio (SPSR). The control of the VS waveform is undertaken by the continuous power hardware 203. In the present invention, the clocking signals required to generate voltage waveforms 303 and 304 are generated from a system clock which has a period less than ts.

FIG. 3 also shows the output data 305. It should be noted that a delay exists between the time the data is sampled to the time the data becomes available. This time is denoted td. That is, after this propagation delay, td, the output data becomes valid for the time interval, ts.

Adaptive Symbol Period Sampling

The shortened pulse width of the baud periods spreads the signal energy over a wider bandwidth in the frequency domain according to the SYNC function shape of the fourier transform of the pulse. The Fourier transform of an arbitrary function is given by $$V(\omega) = \int_{-\infty}^{\infty} v(t) e^{-j\omega t} dt \quad (1)$$

where v(t) is the time domain representation of the function and ω is the angular frequency. When the system power is cycled on and off as with symbol period sampling (or Duty Cycling) the incoming waveform is effectively multiplied by a pulse of duration T where T is the on time of the system power. For duty cycling, this period is too long to noticeably affect the frequency domain representation of the incoming waveform. However, for symbol period sample, the pulsing can have a substantial impact. Since the duration of the pulse for symbol period sampling is ts, the fourier transform will be given by $$V(\omega) = \int_{-\frac{ts}{2}}^{\frac{ts}{2}} \cos \omega_0 t \, e^{-j\omega t} dt \quad (2)$$

where it has been assumed that the input function is a sinusoid of frequency $\omega_0$ and the pulse has a magnitude of unity. The positive frequency solution of this equation is the well-known SYNC function given by $$V(\omega) = \frac{\sin\left[(\omega_0 - \omega)\left(\frac{ts}{2}\right)\right]}{\omega_0 - \omega}. \quad (3)$$

The effect described by this equation is that for pulses of shorter duration (smaller ts), the spectral energy of the signal is spread over a wider range of frequencies. Since the receiver bandwidth is often limited to the information bandwidth through filtering, some loss of receiver sensitivity (or equivalently, output signal-to-noise ratio) may result. This effect will increase as SPSR becomes smaller. The maximum receiver sensitivity, however, is only required in areas of low signal strengths.

The present invention provides a mechanism to adjust the length of time ts of the pulse for the VS voltage waveform. The present invention adjusts the time ts according to a quality measure of the signal. The quality measure used to control the adjustment of the time ts may be the signal strength, the bit error rate, a measure indicative of the bit error rate, such as the signal-to-noise ratio or the capture ratio, or other means by which a determination is made as to whether the time ts is to be adjusted. In one embodiment, the signal strength is measured directly, such as with a detector. In this case, the time period can be increased as the signal strength diminishes. A threshold signal strength level could be set up, such that the symbol period sampling could be disabled if the signal strength is below the threshold. This adjustment may take place during every baud period. In another embodiment, the signal strength can be measured indirectly, such as by measuring the bit error rate. In this case, depending on the bit error rate, the size of period ts can be adjusted. For example, if the bit error rate indicated the presence of an error over a period of a predetermined number of bits, then the symbol period sampling could be disabled. One limitation to using the bit error rate is that multiple bits must be received and evaluated before a determination can be made as to whether an error occurred. Thus, using the bit error rate as a measure of signal strength, the size of ts cannot be adjusted on a bit-by-bit basis, as is possible using the detector. Therefore, the present invention provides a mechanism to either monitor the received signal strength or the bit error rate to adjust the SPSR according to the required sensitivity for the prevailing signal strength conditions. Therefore, the present invention allows adjusting the SPSR according to the required sensitivity for the prevailing signal strength conditions based on the received signal strength or bit error rate. It should be noted that the maximum receiver sensitivity will occur when SPSR equals 1.

Figure 7:
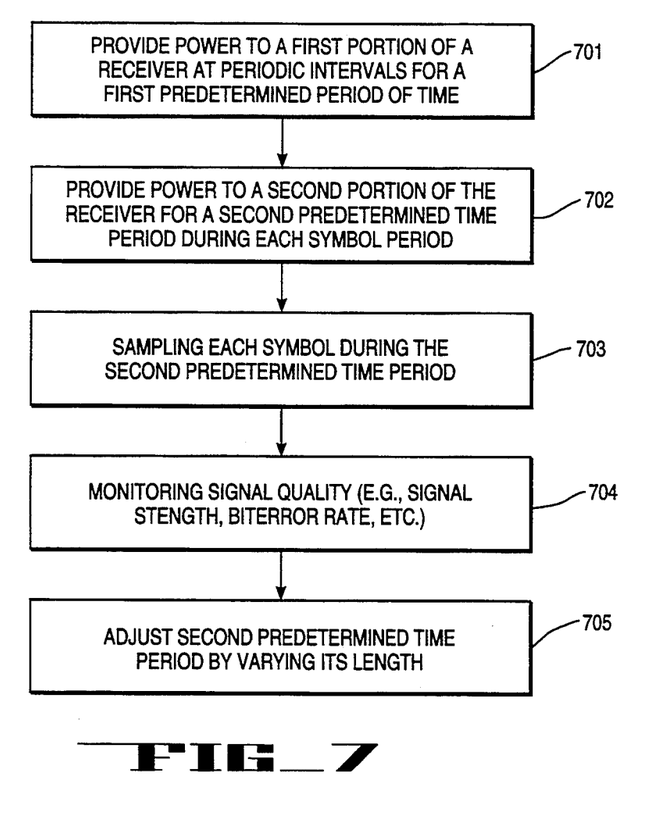
FIG. 7 is a flow diagram of one embodiment of the process of the present invention.

FIG. 7 is a flow diagram of one embodiment of the process of transferring a signal according to the present invention.

One Embodiment Of The Present Invention

Figure 4:
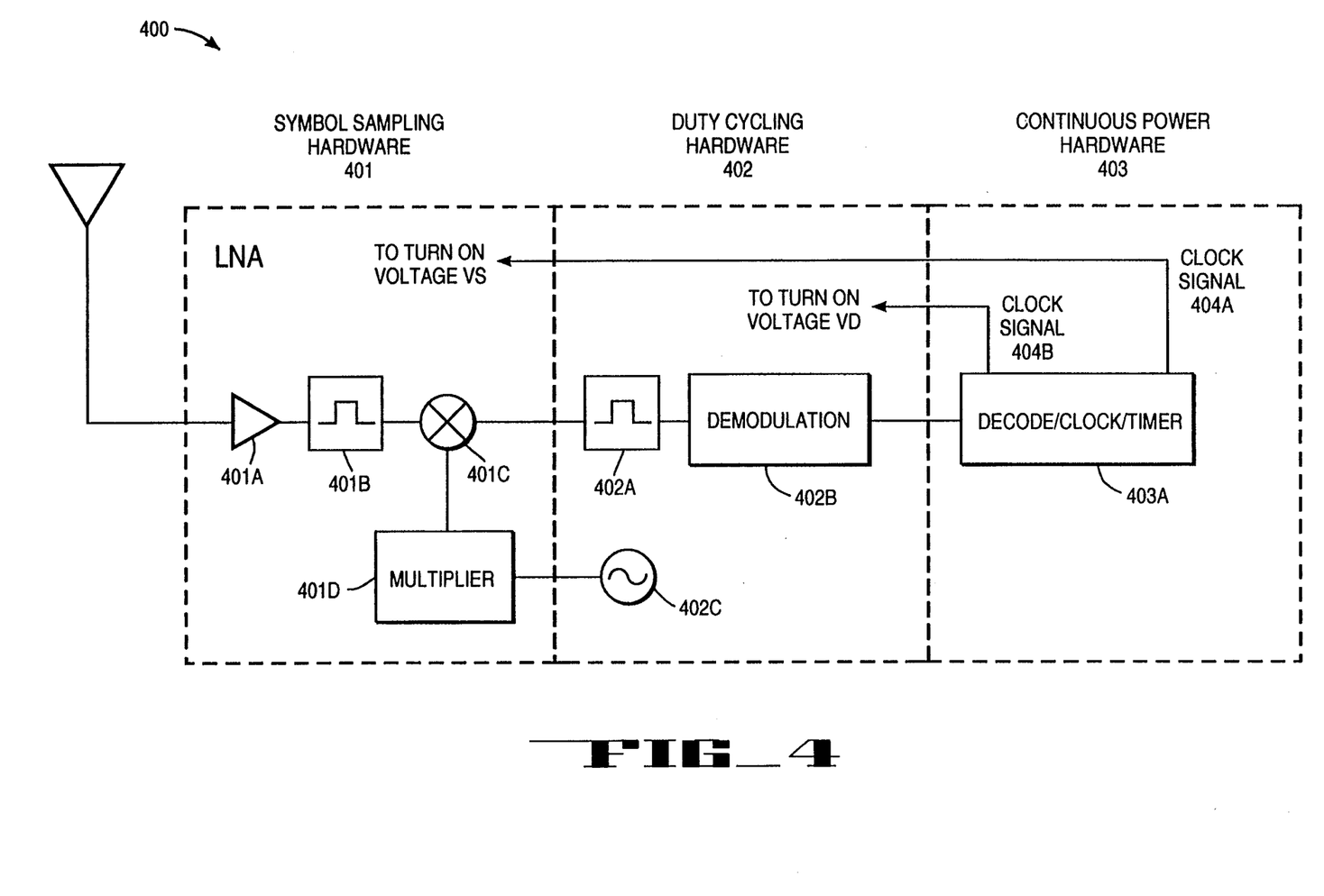
FIG. 4 is a block diagram of a pager receiver.
Figure 5A:
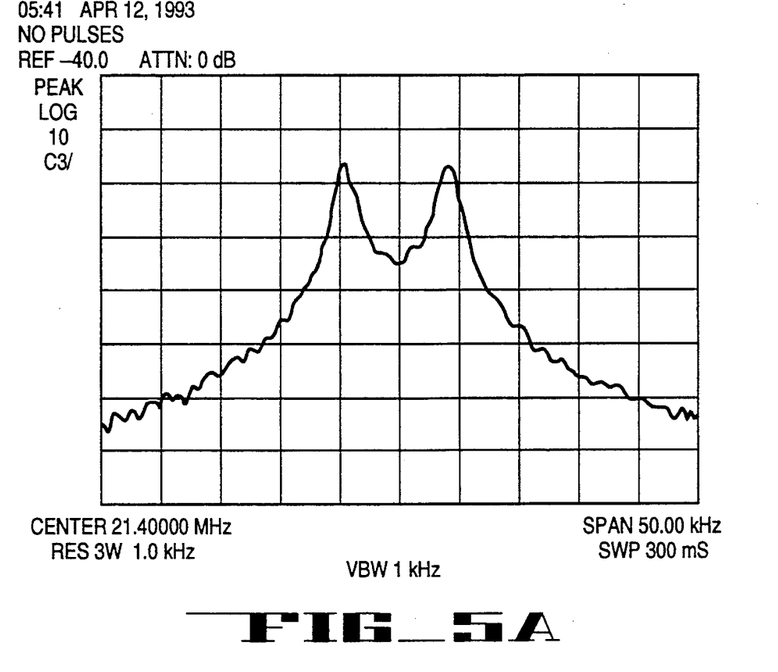
FIGS. 5A–5D is an example of received waveforms having different symbol period sampling ratios.
Figure 5B:
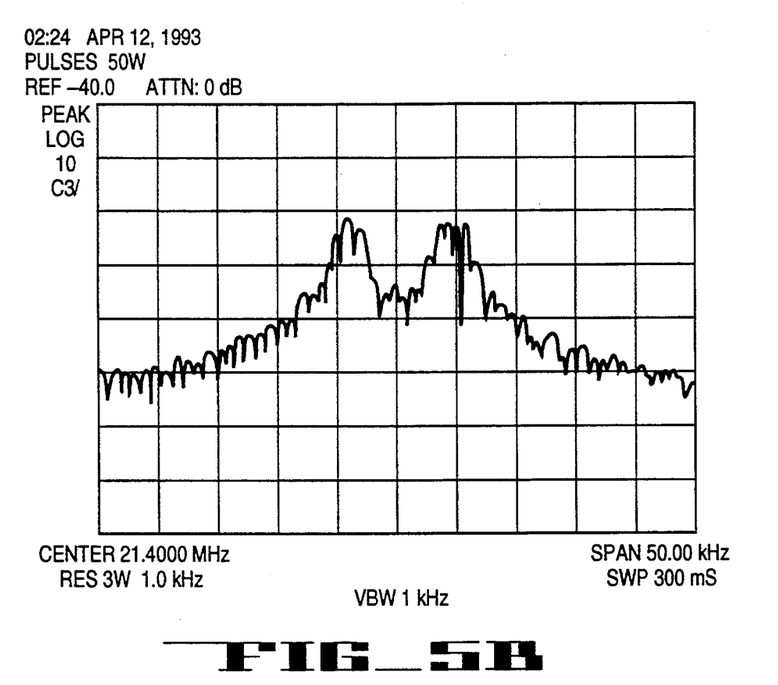
Figure 5C:
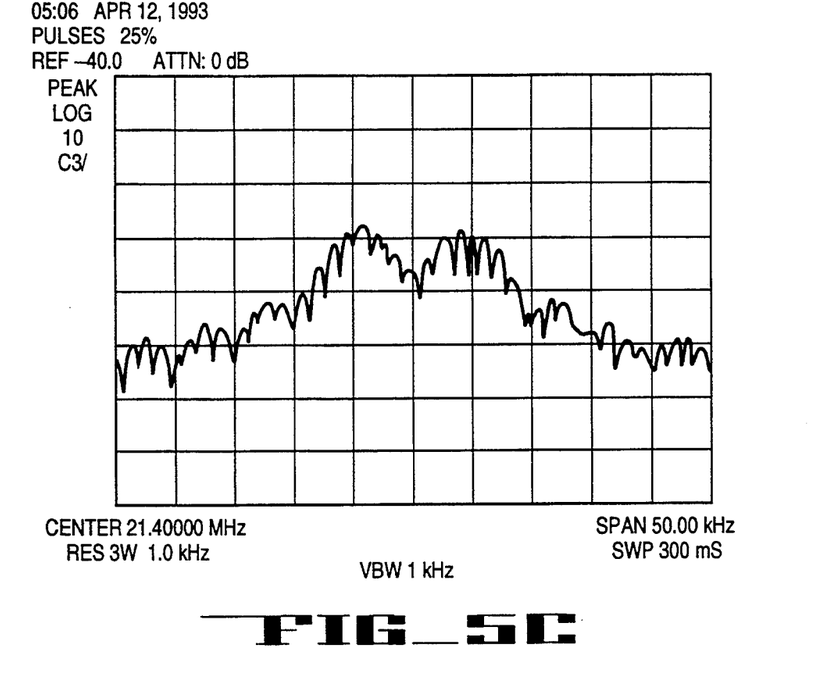
Figure 5D:
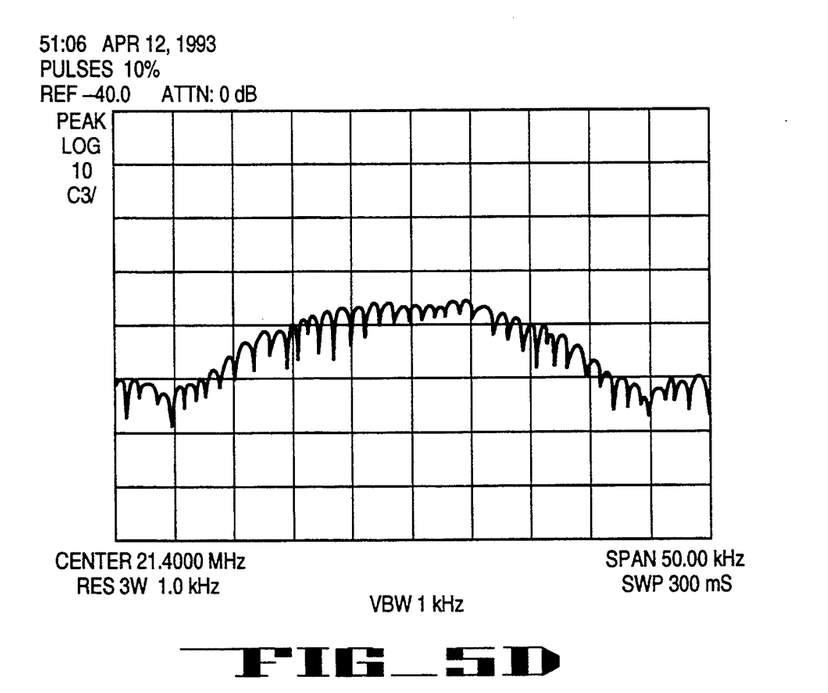

A block diagram of one embodiment of a paging receiver is shown in FIG. 4. The operation of the paging receiver, including its components, is well-known in the art, with the exception of the symbol period sampling of the present invention. The hardware in the paging receiver is partitioned according to the power function. The symbol period sampling hardware 401 of the pager 400 includes a low noise amplifier 401A, filter 401B, down converter 401C and multiplier 401D and operates when powered by the VS voltage. Low noise amplifier 401A is coupled to receive a receive signal and outputs an amplified signal to filter 401B. Filter 401B attenuates unwanted signals. The output of filter 401B is coupled to down converter 401C. Down converter 401C is also coupled to receive the output of frequency multiplier 401D, which multiplies the frequency from an oscillator (i.e., oscillator 402C) by an integer. Down converter 401C receives the filtered signal and converts it to a lower frequency. In the currently preferred embodiment, the signal received by low noise amplifier 401A is at a frequency of approximately 931 MHz. The output of down converter 401C is at 21.4 MHz. Once the signal has been down converted, it is sent to duty cycling hardware 402.

Duty cycling hardware 402 of pager 400 comprises a filter 402A, a demodulation device 402B and an oscillator 402C. The down converted signal is coupled to the input of filter 402A. The output of filter 402A is coupled to the input of the demodulation device 402B. The output of demodulation device 402B is the output of duty cycling hardware 402.

Filter 402A filters the signal from down converter 401C to the channel bandwidth. Demodulation device 402B demodulates the frequency shift keyed (FSK) signal using a limiter discriminator technique which is well-known in the art. Duty cycling hardware 402 also includes oscillator 402C which supplies a sinusoidal signal to multiplier 401D. Oscillator 402C is not included in symbol sampling hardware 401 since its turn on time prevents it from being successively power cycled during a symbol sampling interval. In the currently preferred embodiment, the demodulation function performed by demodulation device 402B is also not cycled using the symbol period sampling because its design requires the use of a second local oscillator which could not be power cycled at the appropriate speed. In one embodiment, these two functions are combined on a commercially available integrated circuit chip. It should be noted that these functions of filtering and demodulation could be designed for inclusion in symbol period sampling hardware 401.

The demodulated signal is coupled to decode/clock-/timer hardware 403A of the continuous power hardware 403. Decode/clock/timer 403A receives a digital bit stream and decodes the digital bit stream to obtain information. Decode/clock/timer block 403A also supplies the necessary clocking for turning on the voltages VD and VS to both the duty cycling hardware 402 and the symbol sampling hardware 401 respectively. In one embodiment, the power generation circuitry (e.g., battery, DC—DC converters, regulators, and power switches) is always available and, therefore, is part of the continuous power hardware although the power drain is near zero.

Example Spectrum and Measured Digital Data Samples

In order to observe the effect of the symbol sampling technique of the present invention on the spectrum of the input signal of the paging receiver, the output of the mixer was measured on a spectrum analyzer for different values of SPSR. An input Binary Frequency Shift Keyed (BFSK) signal was generated with a signal generator at a frequency of 931.9375 MHz with alternating frequency offsets of +/−4.5 KHz with the baud rate at 2400 Bits per second. The down converted signal centered at 21.4 MHz is shown in FIG. 5 for symbol sampling ratios of 1,0.5, 0.25, and 0.10. Note that the signal bandwidth spreads at lower ratios. At a ratio of 0.10, the two BFSK frequencies become indiscernible for the 1 KHz resolution bandwidth of the spectrum analyzer used for this measurement. The BFSK signals may still be demodulated even at the 0.10 ratio.

Figure 6:
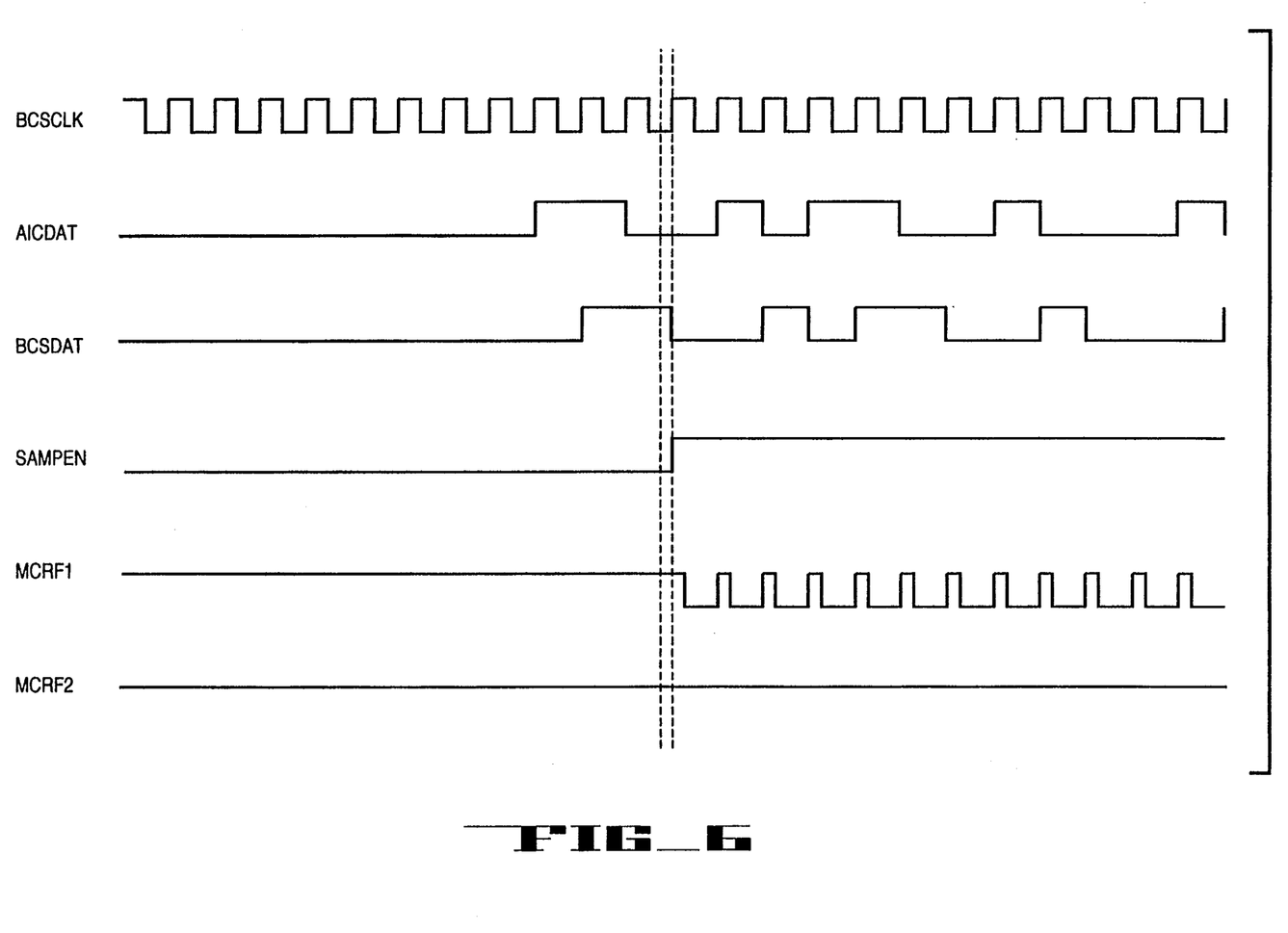
FIG. 6 is a timing diagram depicting an example of the present invention.

An example of the digital response of the paging receiver of FIG. 4 is shown in FIG. 6. A random bit pattern was generated with a pattern generator, encoded using a BCH 31:21 coding algorithm and BFCK modulated at a center frequency of 931.9375 MHz. The modulated signal was injected into the front end of the paging receiver, down converted, and decoded. With a baud rate of 1200 bps, the symbol period sampling ratio was adjusted to 0.3 if no errors were detected in a 32-bit encoded bit sequence or codeword. If an error was detected, than the symbol sampling ratio was reset to 1.0.

Referring to FIG. 6, the clock BCSCLK has a period equal to the symbol period; AICDAT is the input bit stream; BCSDAT is the decoded output bit stream; SAMPEN is 0 when the SPSR=1.0 and 1 when the SPSR =0.3; MCRF1 is the control signal for the power switch to the symbol sampling hardware; and MCRF2 is the control for the power switch to the duty cycling hardware. When these bits are high, the power to the respective sections are on and when they are low, the power is off. The dotted line indicates the start of a new codeword. It should be noted that MCRF2 is always high during this sequence since the sequence shown is part of the on period of the duty cycle. During the first codeword, SAMPEN is low and MCRF1 is always high indicating the symbol sampling technique is not enabled. Since no errors are detected in this first codeword, SAMPEN transitions to high at the start of the second codeword, thereby enabling the symbol period sampling of the present invention. The control line MCRF1 is then pulsed on for 250 μS of each 833 μS symbol period. As shown, the output data BCSDAT continues to track the input data AICDAT (delayed by 1 symbol period) after the symbol sampling technique is enabled.

The present invention provides a technique for reducing the power consumption in digital communication receivers and transmitters through the use of symbol period sampling. Although only a pager implementation has been shown, the present invention may be applied to digital cellular, packet data, paging, digital cordless telephone, wireless modems, wireless local and wide area networks, digital satellite communications, personal communications networks, and other types of digital communications devices.

It should be noted that the present invention may be used in addition to the traditional duty cycle in order to achieve increased power savings. The present invention is most effective in receivers operating at low bit rates where the power to the circuitry can be turned on for a small fraction of the total bit period. In higher bit rate systems, the power savings is limited only by the switching speed of the pulsed power circuitry.

Figure 8:
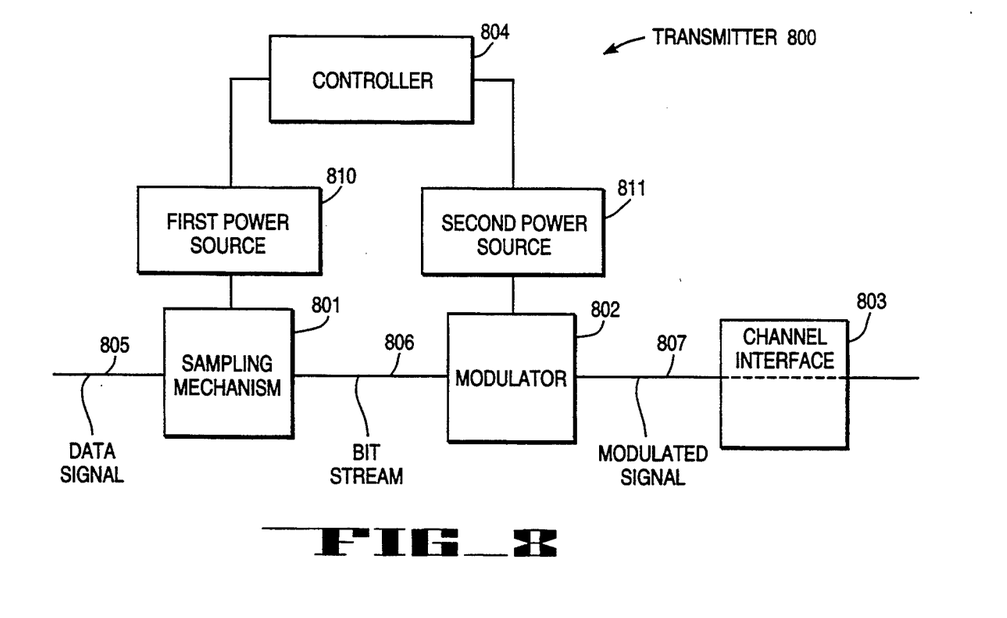
FIG. 8 is a block diagram of one embodiment of the transmitter of the present invention.

The present invention may also be used in transmitters where the frequency spreading caused by the symbol period shortening can be accommodated within the given frequency allocation. An example of such a transmitter is shown in FIG. 8 and described below. The transmitter 800 comprises the following units: a sampling mechanism 801, a modulator 802, a channel interface 803, and a controller 804. The sampling mechanism 801 is powered by a first power source 810 for a predetermined period that is shorter than the symbol period and samples the data signal 805 during the predetermined period to produce a bit stream 806. The modulator 802 is powered by a second power source 811 and modulates the bit stream 806 to a carrier signal to produce a modulated signal 807. The channel interface 803 sends the modulated signal 807. The controller 804 is continuously powered and enables the first and second power sources during the sampling period and the duty cycling period, respectively. Thus, a transmitter based on the claimed invention has been described.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for reducing power consumption in digital communications systems has been described.

We claim:

1. A method of transferring a signal comprising a plurality of symbols from a source to a destination with a communications unit in a digital communications system comprising the steps of:
   providing power to a portion of the unit for a single predetermined time interval during each symbol period, wherein the single predetermined time interval is less than the symbol period; and
   sampling one of the plurality of symbols of the signal during each single predetermined time interval, wherein the portion of the unit receiving power samples each symbol of the signal only once during the symbol period, such that the signal is transferred from the source to the destination.

2. The method defined in claim 1 wherein the symbol period comprises one bit period.

3. The method defined in claim 1 wherein the step of providing power occurs during a duty cycling period of time in a receive cycle.

4. The method defined in claim 1 further comprising the step of adjusting duration of the single predetermined time interval according to a quality measure of the signal while receiving the signal.

5. A method of receiving a signal comprising a plurality of symbols by a receiver in a digital communications system comprising the steps of:
   providing power to a portion of the receiver for a single predetermined time interval during each symbol period, wherein the single predetermined time interval is less than the symbol period; and
   sampling the signal during each single predetermined time interval to obtain one of the plurality of symbols, wherein the portion of the receiver receiving power samples each symbol of the signal only once during the symbol period, and wherein the step of sampling further comprises adjusting duration of the single predetermined time interval based on a quality measure of the signal.

6. The method defined in claim 5 wherein the symbol period comprises one bit period.

7. The method defined in claim 5 wherein the step of providing power occurs during a duty cycling period of time in a receive cycle.

8. The method defined in claim 5 further comprising the steps of monitoring the signal strength and varying the length of the single predetermined time interval according to the signal strength, such that the single predetermined time interval is increased when the signal strength is below a first threshold and decreased when the signal strength is higher than a second threshold.

9. The method defined in claim 5 further comprising the steps of monitoring the bit error rate and varying the length of the single predetermined time interval according to the bit error rate, such that the single predetermined time interval is increased when the bit error rate is higher than a first threshold and decreased when the bit error rate is below a second threshold.

10. A method of transferring a signal which has a signal strength that varies and contains data in the form of a plurality of symbols, wherein the signal is received by a receiver in a digital communications system, said method comprising the steps of:
    providing power to a first portion of the receiver at periodic intervals for a first predetermined time period, wherein the first portion of the receiver continues to receive power at said period intervals to detect the signal; and
    receiving the signal during the first predetermined time period, wherein the step of receiving comprises providing power to a second portion of the receiver for a second predetermined time period during each symbol period and sampling each symbol during the second predetermined time period, wherein the second predetermined time period is less than the symbol period and less than the first predetermined time period
    and wherein the second portion of the receiver receiving power samples each symbol of the signal only once during each symbol period, such that data is recovered.

11. The method defined in claim 10 wherein the symbol period comprises one bit period.

12. The method defined in claim 10 further comprising the step of adjusting duration of the second predetermined time period according to the strength of the signal.

13. The method defined in claim 12 further comprising the steps of monitoring the signal strength and varying the length of the second predetermined time period according to the signal strength, such that the second predetermined time period is increased when the signal strength is below a first threshold and decreased when the signal strength is higher than a second threshold.

14. The method defined in claim 12 further comprising the steps of monitoring the bit error rate and varying the length of the second predetermined time period according to the bit error rate, such that the second predetermined time period is increased when the bit error rate is higher than a first threshold and decreased when the bit error rate is below a second threshold.

15. A receiver for receiving a signal in a communications system, wherein the signal has a signal strength that varies and comprises a plurality of symbols, said receiver comprising:
   a front end receiving mechanism to sample the signal and produce a sampled signal, wherein the front end receiving mechanism is powered by a first power source;
   a demodulator coupled to the front end receiving mechanism to demodulate the sampled signal to produce a bit stream, wherein the demodulator is powered by a second power source; and
   a decoder coupled to receive the bit stream and decoding the bit stream to produce data,
   a controller to enable the first power source for a predetermined time period during each symbol period, wherein the predetermined time period is less than the symbol period, such that the front end receiving mechanism samples the signal only once during the predetermined period of time.

16. The receiver defined in claim 15 wherein the controller further comprises means for adjusting the predetermined time period.

17. The receiver defined in claim 16 wherein the predetermined time period is adjusted according to signal strength.

18. The receiver defined in claim 15 wherein the signal is received during a receive cycle and the second power source is enabled only during the receive cycle.

19. The receiver defined in claim 18 wherein the front end receiving mechanism comprises an amplifier, a mixer and a multiplier.

20. A transmitter for transmitting a data signal in a communications system comprising:
   sampling means for sampling the data signal to produce a bit stream, wherein the sampling means is powered by a first power source;
   modulation means for modulating the bit stream to a carrier signal to produce a modulated signal, wherein the modulation means is powered by a second power source;
   channel interface means for sending the modulated signal; and
   control means for enabling the first power source is enabled for a predetermined time period during each symbol period, wherein the predetermined time period is less than the symbol period, such that the signal is sampled only once during the predetermined period of time.

* * * * *